United States Patent [19]

Terral

[11] Patent Number: 4,620,349

[45] Date of Patent: Nov. 4, 1986

[54] APPARATUS FOR ESTABLISHING PIPE JOINT SEALS

[76] Inventor: Ben D. Terral, P.O. Box 1799, Huntsville, Tex. 77340

[21] Appl. No.: 755,338

[22] Filed: Jul. 16, 1985

[51] Int. Cl.⁴ ............................................. B23P 19/02
[52] U.S. Cl. ...................................... 29/235; 29/451; 285/332.3; 285/333; 285/349; 10/10 P
[58] Field of Search ...................... 29/451, 235, 281.6; 285/95, 332.3, 333, 349; 10/10 P

[56] References Cited

U.S. PATENT DOCUMENTS

| | | | |
|---|---|---|---|
| 551,790 | 12/1895 | Savory | 29/281.6 X |
| 2,266,874 | 12/1941 | Larson | 29/235 X |
| 2,374,358 | 4/1945 | Kling et al. | 29/235 X |
| 2,474,556 | 6/1949 | Stone | 285/349 |
| 2,631,871 | 3/1953 | Stone | 285/349 X |
| 3,020,570 | 2/1962 | Wallace et al. | 10/10 P |
| 3,150,702 | 9/1964 | Buckley et al. | 10/10 P X |
| 3,159,855 | 12/1964 | Wallace et al. | 10/10 P X |
| 3,378,912 | 4/1968 | Wallace | 10/10 P X |
| 3,641,659 | 2/1972 | Colgan et al. | 29/235 X |
| 3,731,361 | 5/1973 | Tatterson et al. | 29/281.6 X |

Primary Examiner—Charlie T. Moon
Attorney, Agent, or Firm—Robert M. Carwell

[57] ABSTRACT

A sealing assembly is clampable to the end of a threaded male pipe section. The assembly includes an aperture which guides a drill bit radially inwards to establish a radial blind bore in the outer surface of the pipe section into the threads thereof. A cylinder is slidably positionable over the aperture and carries an elongate strip of resilient sealing material slidably disposed in a transverse slot therethrough and a slidable cylindrical punch shaft coaxially aligned with the cylinder. Radially inward movement of the shaft punches out a cylindrical sealing plug from the strip. The plug is forced by continued inward movement of the shaft along a cylindrical aperture in the cylinder which receives the shaft and is in coaxial alignment therewith until the plug is press-fit into the radial blind bore. Upon make up of a pipe joint comprising the male section having the thus installed plug and a female section, the internal threads of the female section cut through the outer surface of the sealing plug thereby effecting a fluid-tight seal between the threads of the respective sections, thereby preventing helical fluid leakage in the space formed between the mating threads of each section.

10 Claims, 12 Drawing Figures

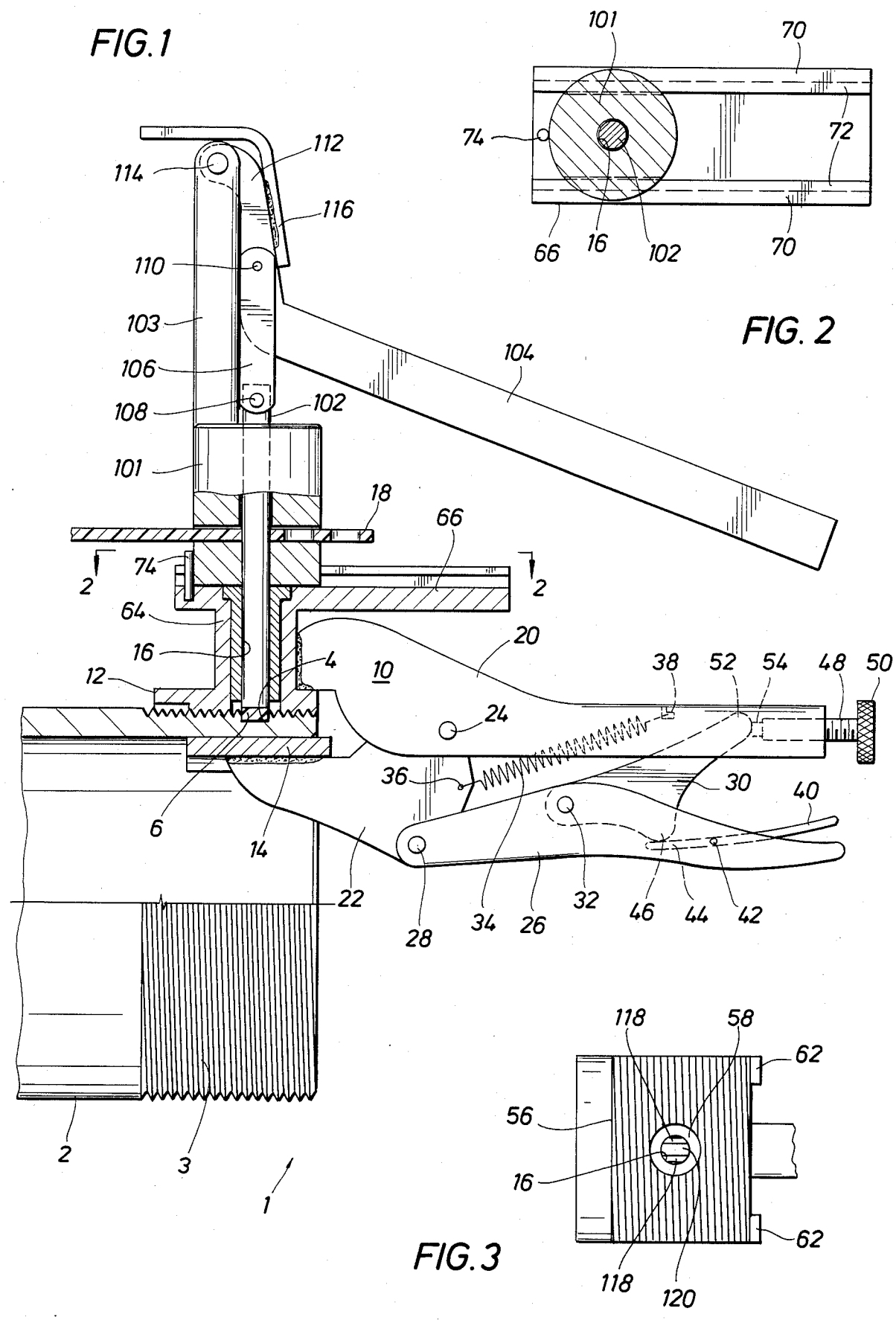

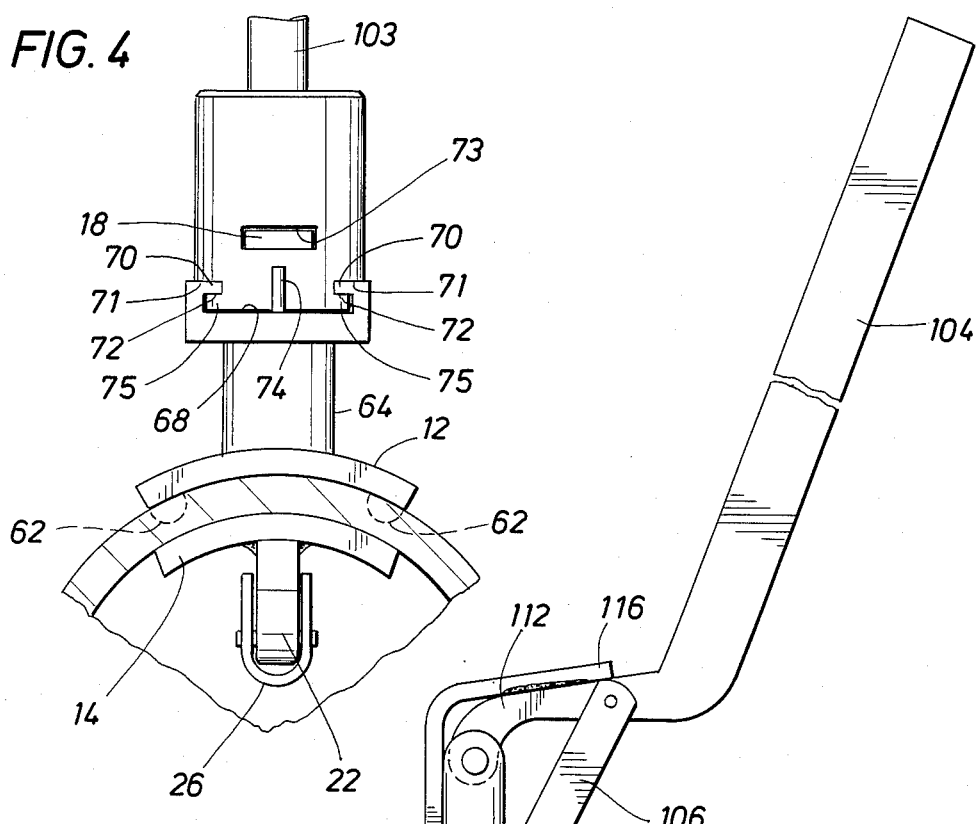
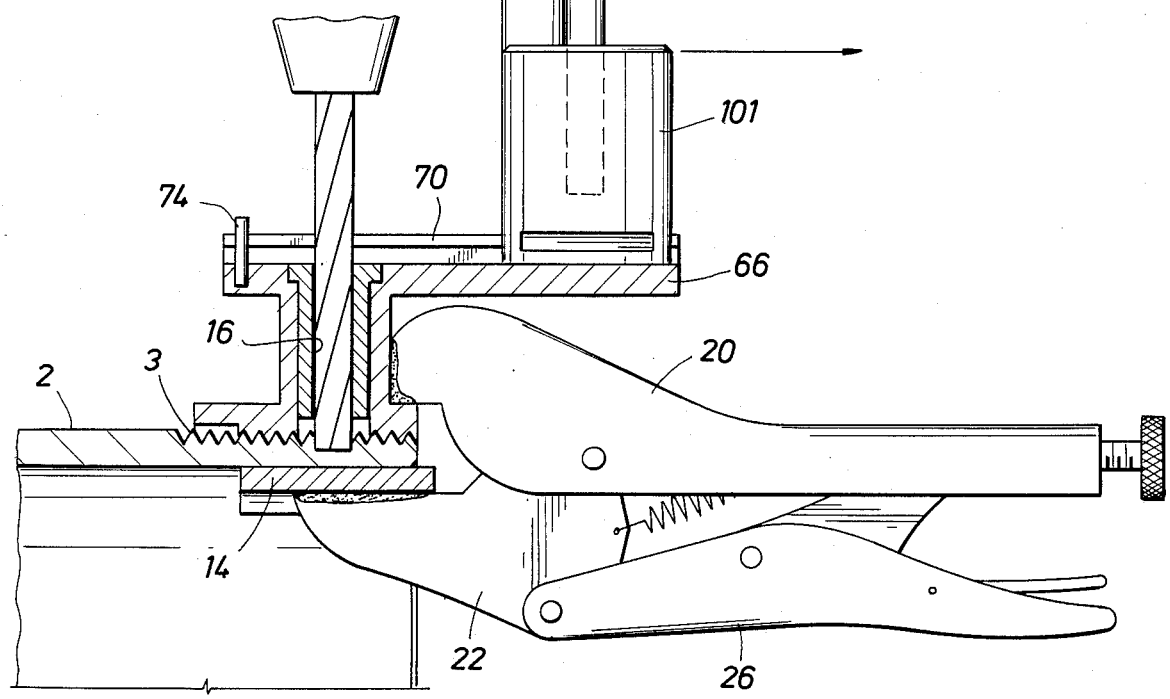

APPARATUS FOR ESTABLISHING PIPE JOINT SEALS

BACKGROUND OF THE INVENTION

This invention relates to methods and apparatus for effecting seals to prevent fluid leakage through thread clearances in tubular goods, and having particular utility for sealing joints in well pipes such as casing, tubing, drill pipe, and the like. More particularly, the present invention, in its more specific aspects, is directed to methods and apparatus for making and installing seals of the resilient plug type which may be installed adjacent the end of a threaded male pipe section into the outer surface thereof.

It has long been known that helical clearances occur in threaded pipe joints such as those employed in the oil and gas industry between the crests of the threads of one tubular member and the opposing recess space adjacent the thread roots of the other tubular member which threadedly receive these crests. These clearances are highly undesirable, permitting fluid leakage therethrough often due to commonly encountered high pressures within the pipe and the like. Numerous means have been employed in the past in an attempt to stop or minimize this leakage such as providing various thread designs which number well over fifty in oil and gas applications alone, for example. Further attempts to seal off these spaces have included coating the threads with an appropriate pipe dope in a manner well known to those familiar with the art. Other means have even included provision of various annular sealing rings, gaskets, or the like.

Yet an additional technique employed in attempts to solve the problem may be characterized by insertion into a transverse radial blind bore in the threads of one of the pipe joint sections of a resilient cylindrical disc or plug which deforms upon made up of the joint to fill the spiral clearance, thereby forming an element establishing a damming or sealing relation to prevent the aforesaid fluid leakage. Representative such pipe joint seals may be seen depicted in U.S. Pat. Nos. 2,631,871 and 2,474,556 to Stone.

Many problems have been associated with effecting to make up and installation of such cylindrical plug-type seals. First, it was necessary to establish the appropriate radial blind bore in one of the pipe sections. This bore must preferably be oriented a prescribed distance from the end of the pipe section and have uniform depth, circumference, and transverse orientation relative to the longitudinal axis of the pipe to receive a sealing plug having dimensional and compressional characteristics preselected to effect the desired sealing. Repeatedly, quickly, and uniformly establishing such precisely controlled counterbores, particularly in field conditions wherein jigs are not readily and conveniently available, proved to be difficult.

Moreover, assuming such a radial blind bore of the proper dimensions, orientation, and location has been established, insertion of an appropriate sealing plug in the bore so as to seat in proper alignment was further found to be time consuming and frequently difficult to achieve. Often such sealing plugs and the mating radial blind bores may preferably be of a relatively small nominal width, traversing only a few of the pipe threads. Accordingly, the sealing elements or plugs may, in like manner, be of a relatively small dimension rendering their handling difficult. Still further, inasmuch as the sealing element was preferably retained within the bore by means of a pressfit, proper installation and orientation of the plug within the radial blind bore was frequently found to be troublesome. Moreover, the separate repeated operations of fabricating the plug, drilling the counterbore, and inserting the plug were found to be quite tedious and time consuming. This was particularly the case wherein pipe sections and corresponding joints and seals numbering in the hundreds may be required as, for example, in a typical oil or gas well drilling or production operation.

With respect to the seal plugs themselves, it has been conventional to provide such plugs with preformed projecting lips or segments on the outer surface thereof or to cut such segments into the surface after installation of the plug but before make up of the pipe joint. It has been found that such approaches are often unsatisfactory requiring close tolelrances and failing to provide the desired degree of sealing such as in conditions of higher pressures.

It was thus highly desirable to provide methods and apparatus for effecting make up and installation of a plug-type seal with superior sealing characteristics wherein the operation could be reliably performed uniformly, simply, inexpensively, and with a minimum number of steps, and without the requirement for bulky apparatus, so as to facilitate installation of such seals in tubular goods wherein this feature may be desirable.

SUMMARY OF THE INVENTION

A sealing apparatus includes a clamping guide assembly having upper and lower jaw members clampedly affixable to the end of a tubular section. Interconnected to the clamp guide assembly is a guide defining an aperture therethrough aligned in the radially inwards direction towards the longitudinal axis of the tubular section for receiving and guiding a drill bit.

Radially outwards of the guide is a cylinder support means for slidably positioning a guide cylinder between a first position over the aperture in the guide and a second position exposing the aperture. The cylinder further includes an aperture coaxially alignable with the aperture in the guide when the cylinder is in the first position. A strip of resilient material is carried by the cylinder and is slidably extendable across the aperture in the cylinder.

A punch shaft is slidably receivable by the apertures in the cylinder and in the guide in the radial direction.

In operation, with the sealing apparatus thus clamped on the pipe section and with the punch shaft moved radially outwards to permit the cylinder to be moved to the second position, the desired radial blind bore in the outer surface of the tubular lsection is drilled. This is accomplished by insertion of a twist drill bit into the aperture in the guide which guides the bit radially inwards transversely towards the pipe section. Upon drilling the radial blind bore in the outer surface of the pipe section to the desired depth and retraction of the bit from the guide aperture, the cylinder is moved into the first position whereby the apertures in the cylinder and guide are in coaxial alignment. The sealing material strip is moved laterally so as to extend over the aperture in the guide and radially inwards of the punch guide.

The punch guide is thence moved radially inwards whereby the radially inwardmost end of the punch guide punches out a sealing plug from the sealing strip. Further radially inward movement of the punch guide moves the plug radially inward along the aperture in the guide whereby it is press-fit into the radial blind bore.

Stop means carried by the assembly abuttingly engage the end of the pipe section to position the aperture in the guide a desired distance from the end. In one embodiment, the thickness of the sealing strip and the plug cut therefrom relative to the depth of the radial blind bore are preselected whereby upon make up of the pipe joint, the threads on the pipe section not carrying the sealing plug will cut into the radially outwardmost surface of the plug, thereby effecting a fluid-tight sealing of the helical space between the threads of both pipe sections when the joint is made up.

These and other features are provided by the present invention and will be explained as well as the details of certain illustrative embodiments more fully and to better advantage in the following detailed description with reference to the accompany drawings, in which:

BRIEF DESCRIPTION OF THE DRAWINGS

FIG. 1 is a pictorial illustration, partly in section, of an elevational view of the sealing apparatus of the present invention.

FIG. 2 is a top view of a portion of the sealing apparatus depicted in FIG. 1.

FIG. 3 is a pictorial illustration of a bottom view of a portion of the sealing apparatus depicted in FIG. 1.

FIG. 4 is a pictorial illustration of an end view of a portion of the sealing apparatus depicted in FIG. 1.

FIG. 5 is a pictorial illustration, partly in section, of an elevational view of the sealing apparatus of the present invention depicted in FIG. 1 wherein the apparatus is in a second position.

DETAILED DESCRIPTION OF THE INVENTION

Figure 7:
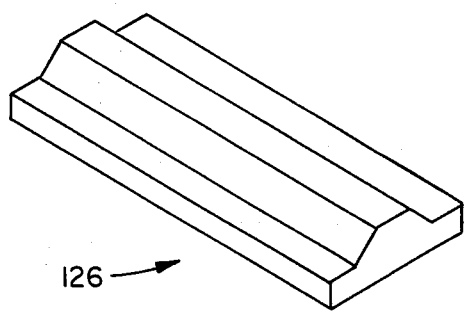
FIG. 7 is a pictorial illustration of a typical sealing plug strip of the present invention.

As illustrative of the application of the method and sealing apparatus 1 of the present invention generally depicted in FIG. 1, a portion of an oil well casing joint structure has been generally indicated in FIG. 1 comprised of an externally threaded pin section 2 which is to be screwed into a corresponding internally threaded box section (not shown) in threadedly mating engagement. It will be recalled that with respect to such joints, it is frequently desirable to install a plug-type sealing element 6, comprised of a resilient plastic material or the like, into a press-fit engagement within a radial blind bore 4 for purposes of preventing leakage of fluids past the element 6 and through the spiral clearance formed between the thread crests of the external threads 3 and the opposing recess space in the opposing threads of the box (not shown).

The purpose of the sealing apparatus 1 of the present invention is three-fold. First apparatus 1 serves to provide a drilling jig for establishing such a radial blind bore 4 at a desired location and depth. Secondly, the apparatus serves the purpose of cutting the sealing element plug 6 from a sealing element strip 18, and thirdly, the apparatus 1 serves to press-fit this plug 6 into the radial blind bore 4.

To better understand the present invention, first a general description of the main components thereof will be given followed by a general description of the operation of the sealing apparatus 1. This will thence be followed by a more detailed discussion of the construction of the apparatus 1 and the plugs 6 which are thereby formed and installed.

First as to the main components of the sealing apparatus 1, with continued reference to FIG. 1, a clamping guide assembly 10 is provided which includes an upper jaw 12 and lower jaw 14 preferably of an arcuate construction (see FIG. 4) so as to fit about the curved contour of section 2 when clamped thereabouts. A first grip member 26 and second grip member 20 provide a clamping force so as to bring the upper and lower jaws 12 and 14 together about the wall of the pin section 2. A guide 64 interconnected to the upper jaw 12 has a vertical punch shaft guide aperture 16 disposed therein. The purpose of this aperture 16 is two-fold. First, it guides a twist drill bit 73 (FIG. 5) when drilling the radial blind bore 4. Secondly, this aperture 16 serves to guide a punch shaft 102 as it moves vertically downward through aperture 16 when punching a sealing plug 6 from strip 18 and when, upon further downward motion, forcing the plug 6 into the radial blind bore 4 as shown in FIG. 1.

A punch guide cylinder 101 is provided having on opposing sides thereof a pair of cylinder grooves 72 (see FIG. 4). A flat punch guide cylinder support 66, disposed on top of the guide 64, defines two opposed horizontally parallel support lips 70 which slidingly and matingly are received by the cylinder grooves 72. In this manner, the cylinder 101 may be moved horizontally from the position shown in FIG. 1 in the direction of the arrow in FIG. 5 to the position depicted therein and vice-versa.

It will be readily apparent in the position of FIG. 5, that aperture 16 is thereby exposed to receive drill bit 73 after which cylinder 101 is moved to the position depicted in FIG. 1 for the operation of punching sealing plug 6 and pressing it into the radial blind bore 4.

With reference to FIG. 4, cylinder 101 will further preferably define a horizontal sealing element strip receiving slot 69 for receiving the sealing element strip 18 which slides therethrough. A lever 104 pivots about the uppermost end of a vertical standoff member 103 and is interconnected to punch shaft 102 by means of a linkage arm 106. In this manner, lever 104 may be brought to a position vertically above cylinder support 66, sealing element strip 18, and receiving slot 69, as shown in FIG. 5, by sufficient vertical rotation of lever 104. In this position, strip 18 may be slid horizontally out of the way to expose aperture 16 for the drilling operation. However, when cylinder 101 is slid back to the position shown in FIG. 1, lever 104 may thence be rotated downwards as shown therein. This forces a sealing plug 6 to be punched from the strip 18 (as evidenced by holes 125 in strip 18). The plug 6 is thence forced downwards along aperture 16 further downward rotation of lever 104 and downward movement of punch shaft 102 until sealing plug 6 is press-fit into radial blind bore 4.

In summary then, in a brief description of the sealing apparatus 1 of the present invention, lever 104 is moved to the upward position of FIG. 5 so that strip 18 may be inserted in strip receiving slot 69. Cylinder 101 is thence slid into position as shown in FIG. 5 on cylinder support 66. The apparatus 1 is thence disposed in a position shown in FIG. 5, with upper and lower jaws 12 and 14 clasp about pin section 2 by means of first and second grip members 26 and 20. It will be noted that stops 62 may be provided on jaws 12 and 14 if desired (see FIG. 4) which will abuttingly engage the end of pin section 2 when sealing apparatus 1 is clamped about pin section 2. The horizontal position of these stops 62 relative to aperture 16 may be selected so as to position aperture 16 a desired distance from the end of pin section 2. In this manner, counterbore 4 will accordingly be drilled a desired like distance from the pin section to end, and sealing plug 6 will also be positioned this distance from the pin section 2 end.

Continuing with a description of the general operation of the sealing apparatus 11, when the apparatus 1 has been clamped as shown in FIG. 5, the drill bit 73 is inserted in the aperture 16 and the counterbore 4 is drilled. A stop, such as that provided by chuck shoulder 65 may be employed to insure that radial blind bore 4 is drilled to a desired depth.

Upon drilling counterbore 4, drill bit 73 is removed, and cylinder 101 is slid from the position depicted in FIG. 5 to that in FIG. 1. Lever 104 is thence rotated downwards whereby punch shaft 102 punches the sealing plug 6 from strip 18 and forces this plug 6 downwards through aperture 16 so as to seat in the radial blind bore 4 in a press-fit fashion, whereupon clamping guide assembly 10 is released.

For a next installation operation, cylinder 101 and lever 104 are returned to the position shown in FIG. 5. The apparatus 1 is thence clamped over a next pin section 2 in which a sealing plug 6 is desired in the aforementioned manner and a next radial blind bore 4 is drilled. Upon removal of the drill bit 73, the cylinder 101 is moved into the position of FIG. 1, and strip 18 is advanced along strip receiving slot 69 so that the aperture 16 is again covered by the material of strip 18. Upon movement of lever 104 downwards to the position of FIG. 1, a next sealing plug 6 is thereby formed and installed in the radial blind bore 4.

Now that a general discussion of the construction and operation of the apparatus 1 of the present invention has been given, a more detailed description of some additional features of the preferred construction will herein after follow.

Still referring to FIG. 1, the clamping guide assembly 10 preferably further includes a lower jaw support 22 pivotally pinned by means of pins 24 and 28 to grip members 20 and 26, respectively. A spring 34 is further provided terminating at opposed ends in an aperture 36 in the lower jaw support 22 and an extension 38 carried by the grip member 20. A locking arm 30 is further provided which pivots about a pin 32 disposed in the first grip member 26. The end of locking arm 30 opposite the pin 32 terminates in a locking arm end 52 which abuttingly enages an end 54 of a set screw 50. The screw 50 includes external threads 48 received by the grip member 20 whereby, by adjusting the screw 50 the locking arm end 52 may be rotated about the pin 32. A release lever 40 pivots about a pin 42 and has a lever end 44 in contact with a nub 46 of the locking arm 30. From the foregoing, it will be apparent that in a conventional manner the set screw 50 may be adjusted for the desired clamping force and wall thickness of the pin section whereby when the grip members 20 and 26 are brought towards one another, the jaws 12 and 14 will tightly clamp about the wall of the pin section upon moving the end of the release lever 40 away from the set screw 50, the locking arm end 52 is moved upwards so as to disengage from the set screw end 54, thus releasing the clamping action of the jaws 12 and 14.

Closer inspection of the upper jaw 12 reveals that it will preferably include internal threads 56 so as to more securely attach the sealing apparatus 1 to the pin section 2 wherein these threads 56 will matingly engage the external threads 3 of the pin section 2. It will further be noted from FIG. 1 that a punch shaft guide insert 63 carried by and within the guide 64 actually defines the punch shaft guide aperture 16, and that by preselecting the insert 63 to have the same outer diameter by a different inner diameter, different diameter drill bits 73 and resulting radial blind bores 4 may thus be provided for. It will also be noted that the insert 63 terminates in a shoulder 58 whereby when the sealing apparatus 1 is clamped against the pin section, an outer recess 119 is thereby defined for purposes of accommodating the cuttings resulting from drilling of the radial blind bore 4.

Still referring to FIG. 1, a stop pin 74 is preferably carried by the guide 64. The purpose of this pin 74 is to prevent further movement of the cylinder 101, such that when the cylinder 101 abuttingly engages the stop pin 74, the aperture 16 in the guide is in coaxial vertical alignment with the corresponding vertical aperture extending through the cylinder 101, whereby the punch shaft 102 may be slidingly receiving by both apertures in the cylinder 101 and the guide 64 in the manner depicted in FIG. 1. The lever 104 preferably terminates in a lever end 112 which is pinned by means of pin 114 to the standoff member 103. The linking arm 106 is further pinned at opposing ends by means of lever pin 110 and punch shaft pin 108 to the lever 104 and the punch shaft 102, respectively. In this manner, upon angular rotation of the lever 104 about the pivot point defined by pin 114, this angular movement is translated into a vertical movement of the punch shaft 102 in the desired manner.

Figure 8:
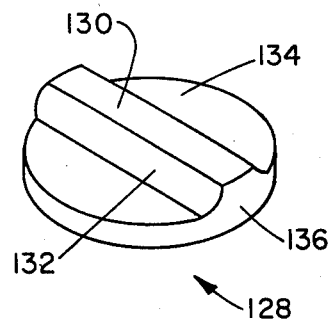
FIG. 8 is a pictorial illustration of another typical sealing plug of the present invention.

With respect to FIG. 2, the cylinder support member 66 may be seen more clearly depicted therein and the manner in which the cylinder 101 is made to slide therealong. FIG. 3 is a bottom view of the upper jaw 12 which depicts additional features of the present invention. More particularly, FIG. 3 depicts an end view of the punch shaft 102 and accordingly discloses the end surface of the punch shaft 102 which acts in the manner of a die for die cutting the desired shape of the sealing plug 6. More particularly, in the embodiment depicted in FIG. 3, a pair of parallel lips 118 are provided in the die end of the punch shaft 102, and disposed therebetween in a groove 120. In this manner, the upper and radially outwardmost surface of the plug 6 may take a sloping form such as that depicted in FIGS. 6, 8, or 11, to be hereinafter described in greater detail.

Reference to FIGS. 4 and 5 will disclose yet additional features of the present invention. It will be noted that in the embodiment being described, the cylinder 101 will also be provided with support lips 75 which are matingly received by support grooves 71 disposed in the support 66 so as to further effect the sliding of the cylinder 101 in a preselected direction along the lower surface 68 of the cylinder 101. With reference to FIG. 5, it will further be appreciated that the lever 104 may be provided with a stop 116 having a generally angular configuration whereby when the lever is attempted to be moved counter clockwise beyond the position depicted in FIG. 5, the free end of the stop 116 will contact the stand off member 103 so as to prevent such further movement.

With reference now to FIGS. 6-12, the characteristics of the sealing plug 6 itself will be hereinafter discussed in greater detail.

FIGS. 6, 8, 9, 10, 11, and 12 depict alternate embodiments of the sealing plug 6 which may be employed. It will be readily appreciated that with reference to FIG. 3, virtually any desired shape of sealing plug 6 as well as the outer surface thereof may be formed by a selection of the configuration of the radially inwardmost or a lower surface of the punch shaft 102.

Figure 6:
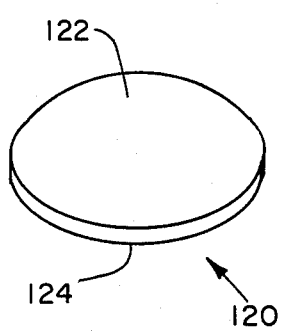
FIG. 6 is a pictorial illustration of a typical sealing plug of the present invention.

Accordingly, with respect to FIG. 6, a sealing plug 120 is shown having a generally curved surface 122 and a flat base 124. In like manner, with respect to FIG. 8, yet an additional embodiment of a plug 128 is shown comprised of a flat base 136, flat shoulders 134, a flat upper face 130, and sloping edges 132 interconnecting the surfaces defined by shoulders 134 and the upper surface 130. It will further be appreciated, with reference to FIG. 7, that in addition to preselecting the configuration of the lowermost portion of the shaft 102 to effect a forming of a sealing plug 6 having the desired shape, it may further be possible to perform the sealing element strips 18 in a desired geometric shape so as to further enhance formation of the plugs 6 into a desired shape. Accordingly, with respect to FIG. 7 in comparison with FIG. 8, a sealing element strip 18 is shown depicted therein from which the plug 128 of FIG. 8 may be fashioned by simply providing for a circular die cut end in the punch shaft 102.

Figure 9:
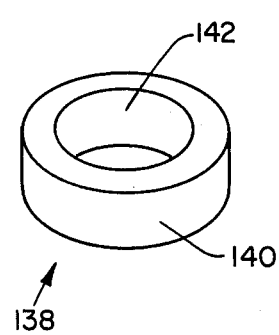
FIG. 9 is still another embodiment of the sealing plug of the present invention.
Figure 10:
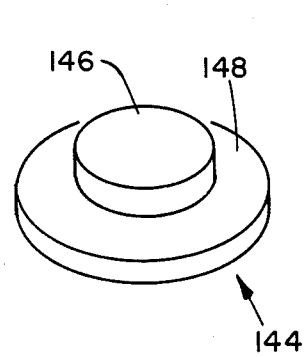
FIG. 10 is still another embodiment of the sealing plug of the present invention.
Figure 11:
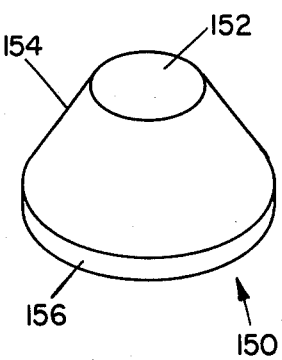
FIG. 11 is yet an additional pictorial illustration of another embodiment of the sealing plug of the present invention.
Figure 12:
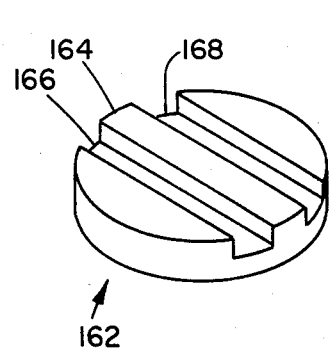
FIG. 12 is a pictorial illustration of still a further embodiment of the sealing plug of the present invention.

In FIG. 9, an alternate embodiment of a sealing plug 138 is shown comprised of a ring-like member 140 having a central annulus 142 extending therethrough. In like manner, with respect to FIG. 10, yet another plug 144 is shown depicted therein which may be fashioned in the shape of a small disc 146 concentrically aligned with a larger disc 148. FIG. 11 depicts yet an additional configuration of a sealing plug 150 in the form of a truncated frusto-conical section having a generally upper flat surface 152, pyramidal sloping outer surfaces 154 and a generally flat base 156. Finally, in FIG. 12, a plug 162 is depicted therein having two generally parallel grooves 166 and 168 defining a generally flat strip 164 disposed therebetween. Whereas, only a few alternate embodiments of plugs 6 may have thus been disclosed with reference to FIGS. 6-12, the invention fully contemplates adjusting, alone or in combination, the geometric configuration of the sealing element strip 18 and/or the endmost or die portion of the punch shaft 102 as desired to effect the desired geometric shape of the sealing element plug 6. With respect to the desired material for the sealing element strip 18, the invention further admits of a number of resilient materials and is not intended to be so limited to any one particular composition of matter for the strip 18. However, it has been found that strips 18 and resultant plugs 6 fashioned out of a Nylon or Teflon material provide the necessasary resilience for effecting the desired sealing and retention of the plug 6 in a press-fit within the radial blind bore 4.

With respect to all sealing plugs of the present invention, it will be appreciated that the surfaces thereof defining the maximum height or thickness of each plug, when the plug is seated in the radial blind bore 4, will preferably extend slightly above or radially outwards of the external threads. The purpose of this is such that when the mating sections of pipe are threadedly joined, the internal threads of the female or box joint will cut into these radially outwardmost surfaces upon make up so as to effect the desired sealing. Accordingly, the thickness of the plugs must be adjusted in functional relation to the depth of radial blind bore and the height of the external threads so that an outer sealing surface of the plug will extend radially outwards from the outermost edges of the external threads.

Moreover, it will further be appreciated that in a preferred embodiment it is desirable for the outer dimension of the punch shaft 102 and the die end thereof be of a slightly smaller dimension than the width of the sealing element strip 18. In this manner, as the sealing strip 18 is advanced as additional plugs are cut, the edges thereof will remain intact with holes punched inwards thereof so that it will remain as a strip notwithstanding presence of the holes 125, as depicted in FIG. 1.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. Apparatus for establishing a fluid seal in the threaded wall of a tubular member, comprising:
    clamp means for clamping said apparatus to said wall;
    guide means carried by said clamp means defining a first aperture transverse to the longitudinal axis of said tubular member and a cylinder support member;
    guide cylinder means defining a second aperture and a sealing element receiving slot therethrough carried by said cylinder support means, said guide cylinder means being slidably positionable along said cylinder support means in a first position wherein said first and second apertures are in registry and a second position where a drill can be inserted into said first aperture to drill a radial blind bore in the threaded tubular wall;
    punch shaft means slidably disposable in said first and second apertures;
    sealing element strip means slidable along said receiving slot; and
    means for moving said punch shaft means to punch a sealing plug out of said sealing strip and moving said sealing plug into said blind bore in the threaded wall of said tubular member.

2. The apparatus of claim 1, further including lever means interconnecting said cylinder means and said punch shaft means for moving said punch shaft means along said first and second apertures in response to movement of said lever means.

3. The apparatus of claim 2, wherein said sealing strip means is positionable along said receiving slot across said second aperture.

4. The apparatus of claim 3, wherein said cylinder means includes a punch shaft guide insert means defining said second aperture.

5. The apparatus of claim 4, further including stop pin means carried by said cylinder support means for preventing relative movement between said cylinder support means and said guide cylinder means when said first and second apertures are in said registry.

6. The apparatus of claim 5, wherein said clamp means includes an upper jaw and a lower jaw clampably disposable on either side of said wall.

7. The apparatus of claim 6, wherein said jaws are arcuately shaped and wherein said upper jaw includes threads for threaded engagement with said threads of said wall.

8. The apparatus of claim 7, wherein said punch shaft means includes a die face means at one end thereof for penetrating said strip means for form a sealing plug.

9. The apparatus of claim 8, wherein said die face means has a preselected shape functionally related to a desired shape of said sealing plug.

10. The apparatus of claim 9, wherein said insert means is removably insertable in said cylinder support means.

* * * * *